(12) United States Patent
Fischer et al.

(10) Patent No.: US 7,158,010 B2
(45) Date of Patent: Jan. 2, 2007

(54) CIRCUIT ARRANGEMENT AND METHOD FOR PHASE MODULATION IN A BACKSCATTERING TRANSPONDER

(75) Inventors: Martin Fischer, Gleichen (DE); Ulrich Friedrich, Ellhofen (DE); Udo Karthaus, Ulm (DE)

(73) Assignee: Atmel Germany GmbH, Heilbronn (DE)

( * ) Notice: Subject to any disclaimer, the term of this patent is extended or adjusted under 35 U.S.C. 154(b) by 423 days.

(21) Appl. No.: 10/855,865

(22) Filed: May 26, 2004

(65) Prior Publication Data

US 2004/0257220 A1   Dec. 23, 2004

(30) Foreign Application Priority Data

May 28, 2003 (DE) ............... 103 25 396

(51) Int. Cl.
*H04Q 5/22* (2006.01)
*H04Q 1/30* (2006.01)

(52) U.S. Cl. ............... 340/10.41; 340/10.4; 340/10.1; 340/10.2; 340/531

(58) Field of Classification Search ............ 340/10.41, 340/10.4, 10.1, 10.2, 531
See application file for complete search history.

(56) References Cited

U.S. PATENT DOCUMENTS

| | | | |
|---|---|---|---|
| 4,040,053 A | 8/1977 | Olsson | |
| 5,119,099 A | 6/1992 | Haruyama et al. | |
| 5,153,583 A | 10/1992 | Murdoch | |
| 5,206,639 A | 4/1993 | Kamens | |
| 5,218,343 A | 6/1993 | Stobbe et al. | |
| 5,564,069 A | 10/1996 | Grabow et al. | |
| 5,606,323 A | 2/1997 | Heinrich et al. | |
| 5,731,691 A | 3/1998 | Noto | |
| 5,889,489 A | 3/1999 | Friedman et al. | |
| 6,054,925 A | 4/2000 | Proctor et al. | |
| 6,347,121 B1 | 2/2002 | Sointula | |
| 6,366,164 B1 | 4/2002 | Hanselmann | |
| 6,621,467 B1* | 9/2003 | Marsh | 343/850 |
| 6,664,770 B1 | 12/2003 | Bartels | |
| 6,941,113 B1 | 9/2005 | Asano | |
| 2002/0080864 A1 | 6/2002 | Kuttruff et al. | |
| 2002/0153996 A1 | 10/2002 | Chan et al. | |
| 2003/0102961 A1 | 6/2003 | Fischer et al. | |
| 2003/0107483 A1 | 6/2003 | Kano | |
| 2003/0205571 A1 | 11/2003 | Flugstad et al. | |
| 2004/0145452 A1 | 7/2004 | Fischer et al. | |
| 2004/0155754 A1 | 8/2004 | Fischer et al. | |

(Continued)

FOREIGN PATENT DOCUMENTS

DE     4017625     12/1990

(Continued)

*Primary Examiner*—Jeffery Hofsass
*Assistant Examiner*—Scott Au
(74) *Attorney, Agent, or Firm*—W. F. Fasse; W. G. Fasse

(57) ABSTRACT

A circuit arrangement for phase modulation in an input circuit of a backscattering transponder includes a varactor and at least one capacitor connected in series between two antenna terminals, and at least two voltage sources selectively connected through at least two switches to at least one terminal of the varactor. A control unit selectively opens and closes the switches in response to the data to be phase-modulated onto the backscattered signal. By selectively connecting the different voltage values of the respective voltage sources to the varactor terminal(s) through the switches, the capacitance of the varactor and correspondingly the input impedance of the input circuit are thereby varied, so as to provide respective different phase positions of the phase modulation.

18 Claims, 1 Drawing Sheet

U.S. PATENT DOCUMENTS

2004/0257293 A1    12/2004    Friedrich et al.

FOREIGN PATENT DOCUMENTS

| DE | 4332475   | 3/1995  |
| DE | 196 14 455 | 10/1997 |
| DE | 198 00 565 | 7/1999  |
| DE | 19933978  | 1/2001  |
| DE | 10158442  | 6/2003  |
| EP | 0 599 143 | 6/1994  |
| EP | 1026832   | 8/2000  |
| EP | 1 120 734 | 8/2001  |
| EP | 1211635   | 6/2002  |
| EP | 1 326 202 | 7/2003  |
| FR | 2 644 308 | 9/1990  |
| GB | 2 224 182 | 4/1990  |
| GB | 2321726   | 8/1998  |

* cited by examiner

CIRCUIT ARRANGEMENT AND METHOD FOR PHASE MODULATION IN A BACKSCATTERING TRANSPONDER

CROSS-REFERENCE TO RELATED APPLICATIONS

This application is related to copending U.S. application Ser. Nos. 10/753,849 and 10/753,859, both filed Jan. 7, 2004, the entire disclosures of which are incorporated herein by reference. This application is further related to the US application entitled "Circuit Arrangement With Simplified Input Circuit For Phase Modulation In A Backscattering Transponder" by U. Friedrich and M. Fischer, being filed Ser. No. 10/855,866 on May 26, 2004, the entire disclosure of which is incorporated herein by reference.

PRIORITY CLAIM

This application is based on and claims the priority under 35 U.S.C. §119 of German Patent Application 103 25 396.3, filed on May 28, 2003, the entire disclosure of which is incorporated herein by reference.

FIELD OF THE INVENTION

The invention relates to a circuit arrangement as well as a method for producing a phase modulation in a backscattering transponder having a varactor in an input circuit thereof.

BACKGROUND INFORMATION

There are various known systems in which a wireless or contactless data transmission is carried out between one or more base stations or reader devices and one or more so-called transponders. Such systems are used, for example, as contactless identification systems or so-called RFID (radio frequency identification) systems. In that case, the data to be transmitted relates to an identification protocol, for example. It is further possible to integrate one or more sensors, for example temperature measuring sensors, on the transponder. Such transponders equipped with integrated sensors are then also referred to as remote sensors, whereby the data to be transmitted may comprise the actual values measured by the sensor.

The transponders, or particularly the receiving/backscattering arrangements thereof, typically do not comprise an active transmitter for actively carrying out the data transmission to the base station. Instead, the transponders are non-active systems that can be designated as passive systems if they do not comprise their own power supply, or as semi-passive systems if they do comprise their own power supply. In such non-active systems, the data transmission over a transmission range or distance of substantially more than one meter is generally carried out using a so-called backscattering or backscatter-coupling of UHF waves or microwaves between the receiving/backscattering arrangement (i.e. transponder) and the base station. While such non-active transponders are sometimes also called receiver/transmitters or receiving/transmitting arrangements, this application uses the more accurate term "receiving/backscattering arrangement", because this arrangement does not actively transmit but rather merely reflects or backscatters the modulated received electromagnetic wave.

In this regard, the base station emits electromagnetic waves, which are received by the transponder, and then modulated by the transponder in accordance with the particular data that are to be transmitted back to the base station. The thusly modulated signal or electromagnetic waves are then reflected or backscattered with the modulation back to the base station. This is generally achieved using an input impedance variation of the receiving/backscattering arrangement, which causes a corresponding variation of the reflection characteristics of an antenna connected thereto. Thereby the reflected or backscattered signal is correspondingly modulated, so that the base station can receive and evaluate the modulated backscattered signal. Various different methods are known for achieving such modulation.

A first known method of carrying out the above described modulation, for example as described in the published European Patent Application EP 1 211 635, the real part of the input impedance is varied by connecting or disconnecting an essentially ohmic (i.e. resistive) load, which causes mainly an amplitude variation or amplitude modulation of the reflected waves. This modulation method is generally referred to as amplitude shift keying (ASK). Disadvantageously, the variable ohmic or resistive load used for the modulation acts as an additional power consumer that loads the voltage supply of the transponder, whereby the maximum operating transmission range between the transponder and the base station is considerably reduced, especially for a passive transponder without its own power supply.

In a second known method of achieving the above discussed modulation, the imaginary part of the input impedance is varied or influenced by varying the capacitance of a capacitor in the input portion or stage of the receiving/transmitting or backscattering arrangement. This causes mainly a phase variation or a phase modulation of the reflected waves, and is generally referred to as phase shift keying (PSK). In comparison to the ASK method, this PSK modulation method practically does not influence the operating voltage, whereby a high operating efficiency of the transponder can be achieved, and the maximum backscattering range between the transponder and the base station is increased.

Such a PSK method as well as a circuit arrangement suitable for carrying out such a method is disclosed, for example in the German Patent Application DE 101 58 442.3 (published Jun. 26, 2003) of the same Assignee as the present application. Also see the counterpart U.S. Published application US 2003/0102961 A1 (published Jun. 5, 2003), the disclosure of which is incorporated herein by reference. According to those publications, a capacitance variation in the input circuit of the device is achieved by means of a varactor, to which a variable control voltage is applied through varactor control means comprising a controllable voltage source. Thereby, in response to the variable voltage applied to the varactor, the capacitance of the varactor is correspondingly varied.

SUMMARY OF THE INVENTION

In view of the above, it is an object of the invention to provide a circuit arrangement as well as an associated method which achieve a simple and effective controllability of a varactor in an input circuit of a backscattering transponder device, which is economical in its fabrication, and which makes good efficient use of the total capacitance swing or range of the varactor in order to ensure a reliable and secure data transmission. The invention further aims to avoid or overcome the disadvantages of the prior art, and to achieve additional advantages, as apparent from the present specification.

The above objects have been achieved according to the invention in a circuit arrangement for phase modulation in a backscattering transponder through input impedance variation of an input circuit of the transponder, comprising a varactor in the input circuit of the transponder, and a varactor control arrangement that applies a variable control voltage to the varactor so as to vary the capacitance of the varactor. Particularly according to the invention, the varactor control arrangement comprises at least two voltage sources, a switching arrangement, and a control unit.

The control unit controls the switching arrangement so as to selectively connect the voltage sources with at least one connection terminal of the varactor depending on the respective phase position or phase angle that is to be achieved in the phase modulation. With such an embodiment using a switching arrangement to selectively connect different voltage sources to the varactor, depending on the phase angle to be achieved, the invention can completely avoid the use of a controllable variable voltage source for generating the control voltage. Such a controllable voltage source having a variable voltage output is significantly more complex and more costly than the inventive solution using plural individual voltage sources and a suitable switching arrangement. Thereby, the invention achieves an overall more-economical solution while still providing a high transmission reliability and security.

In a further embodiment of the inventive circuit arrangement, the varactor particularly and preferably has a characteristic response curve of capacitance versus voltage, which is symmetrical, and particularly rotationally symmetrical, about the point of zero voltage. Such varactors are easy and economical to produce, and can provide a large capacitance swing or range with suitable control voltage activation thereof.

In another further embodiment of the circuit arrangement of the invention, the switching arrangement comprises individual switching devices respectively embodied as high impedance CMOS switches (e.g. CMOS transistors). Such switches can be simply and economically implemented in a semiconductor fabrication process, and ensure a relatively small parasitic loading of the input circuit due to parasitic components.

A further preferred feature of the invention is that one of the voltage sources provides the ground voltage while another of the voltage sources provides a supply voltage. Since such voltage sources are already typically present for the voltage supply in a typical transponder, such an embodiment of the invention can be realized with only slight additional effort, cost and complexity compared to previously existing transponders. Alternatively according to the invention, first and second voltage sources can respectively have opposite polarities relative to a ground or zero voltage, whereby the full capacitance swing or range of the varactor is advantageously utilized.

In a particular preferred and advantageous embodiment of the inventive circuit arrangement, the input circuit of the transponder device includes a first capacitor, the varactor, and a second capacitor connected in series between two antenna connection terminals, and each of the two terminals of the varactor is respectively selectively connectable via a respective switching device to either one of the voltage sources. Through such a circuit arrangement, the capacitance swing or range of the varactor can be fully utilized without requiring a negative voltage to be generated and applied, because the voltage applied to the varactor can be selectively switched-over or reversed in polarity by means of suitable closing and opening of the switching devices.

An alternative preferred and advantageous embodiment of the inventive circuit arrangement includes a first capacitor and the varactor connected in series between two antenna connection terminals in the input circuit of the transponder device, wherein one terminal of the varactor is connected with a first voltage source via a first switching device and with a second voltage source via a second switching device. Each voltage source can respectively produce an associated phase position or phase angle of the phase modulation resulting from the consequent capacitance variation of the varactor. Thus, in other words, the two voltage sources can provide, in total, two phase angles of the modulation. It should be understood that additional voltage sources and associated switching devices could be provided in the circuit arrangement in order to respectively produce additional different phase angles.

The above objects have further been achieved according to the invention in a method of producing a phase modulation in a backscattering transponder by varying the input impedance of an input circuit of the transponder. In order to vary the input impedance, the capacitance of a varactor is varied by applying a suitable varied control voltage to a terminal or terminals of the varactor. Particularly according to the invention, the control voltage is generated by selectively connecting a respective one of at least two voltage sources with at least one terminal of the varactor dependent on the phase position or angle that is to be produced in the phase modulation.

In a further preferred embodiment of the inventive method, to generate or produce a first phase position, a first terminal of the varactor is connected with a first one of the at least two voltage sources and a second terminal of the varactor is connected with a second one of the at least two voltage sources, and to generate or produce a second phase position, the first terminal of the varactor is connected with the second voltage source and the second terminal of the varactor is connected with the first voltage source. In this manner, the inventive method achieves a pole reversal of the control voltage being applied to the varactor, whereby the capacitance swing or range of the varactor is well utilized. This is especially true for varactors of a type having a capacitance-voltage characteristic curve that is symmetrical with respect to zero voltage.

It is further advantageously provided according to the invention, that a third phase angle or position can be achieved by connecting both of the terminals of the varactor with the same one of the voltage sources. In this manner, the resulting potential difference across the varactor is 0 V, which leads to an associated third varactor capacitance as well as a corresponding third phase angle or position.

Another embodiment of the inventive method involves producing a first phase angle by connecting a terminal of the varactor with a first one of the voltage sources, and producing a second phase angle by instead connecting that terminal of the varactor with a second one of the voltage sources. In this context, the first and second voltage sources advantageously have a reversed polarity relative to each other, such that the full capacitance swing or range of the varactor is well utilized.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
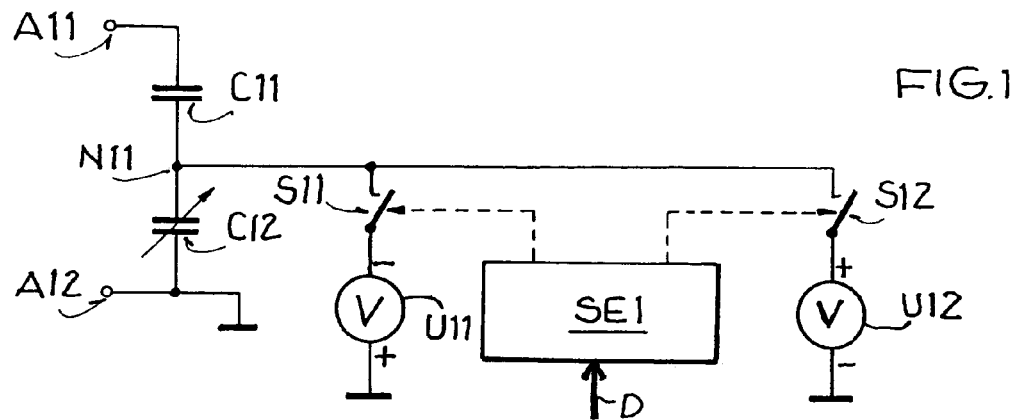
FIG. 1 is a schematic block circuit diagram of a first embodiment of an inventive circuit arrangement for phase modulation in a backscattering transponder.

The circuit arrangement for phase modulation in a backscattering transponder as shown in FIG. 1 is a portion of an input circuit of the transponder, the rest of which is not shown. The inventive circuit arrangement comprises a capacitor C11 and a CMOS varactor C12 connected in series between two antenna terminals A11 and A12, a first voltage source U11 that is selectively connectable via a switching device S11 to a terminal N11 of the varactor C12 (e.g. the terminal N11 between the varactor C12 and the capacitor C11), and a second voltage source U12 that is selectively connectable via a second switching device S12 to the varactor terminal N11. Each of the switching devices S11 and S12 is preferably embodied as a high impedance CMOS switch. The circuit arrangement further comprises a control unit SE1 that is connected to and controls the switching devices S11 and S12.

The switching devices S11 and S12 together form a switching arrangement. The voltage sources U11 and U12, the switching devices S11 and S12, as well as the control unit SE1, together form a varactor control arrangement for generating and selectively applying a control voltage to the varactor C12. More particularly, the control unit SE1 selectively controls the switching devices S11 and S12 in response to and dependent on the phase position or phase angle that is to be achieved in the phase modulation respectively at any given time, so as to correspondingly connect the voltage sources U11 and U12 respectively through the switching devices S11 and S12 to the varactor terminal N11. Namely, depending on the switching position of the switching devices S11 and S12, either the voltage of the first voltage source U11 or the voltage of the second voltage source U12 will be applied to the terminal N11 of the varactor C12. It should be understood that only one of the switching devices S11 and S12 will be closed or switched conductive at any given time. Preferably, the voltage source U11 provides a negative voltage while the voltage source U12 provides a positive voltage.

Figure 2:
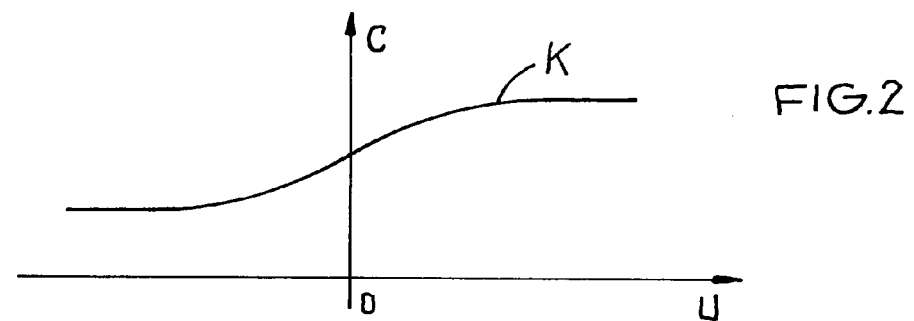
FIG. 2 is a schematic diagram representing the capacitance-voltage characteristic curve of a CMOS varactor used in the circuit according to FIG. 1.

FIG. 2 shows the characteristic curve K of the capacitance C versus voltage U of the CMOS varactor C12. Note that this curve K is substantially point symmetrical or rotationally symmetrical about the intersection point of the curve K with the vertical C axis (i.e. the point of zero voltage). Due to the different (especially opposite) polarities of the voltages of the voltage sources U11 and U12, a large capacitance difference and thus a large capacitance swing or range of the varactor results as negative and positive voltages are applied thereto, as can be seen in FIG. 2. The resulting phase positions of the arising phase modulation thus also comprise a correspondingly large difference therebetween, so that a reliable and secure data transmission is ensured. Namely, this large capacitance difference between the respective different control states of the varactor ensures correspondingly large differences in the input circuit impedance of the transponder device, which in turn assures correspondingly large differences in the resulting phase shift achieved by the phase modulation in the backscattering.

In the present illustrated example using two distinct voltage sources U11 and U12 selectively connected to the varactor C12, two different phase positions or phase angles can be achieved in the phase modulation provided by the input circuit of the backscattering transponder device. It should be understood that further phase positions could also be achieved by adding further unique discrete voltage sources and respective associated switching devices (e.g. a third voltage source selectively connectable to the varactor terminal N11 through a third switching device).

As mentioned above, the control unit SE1 controls the switching devices S11 and S12 in response to and dependent on a control input that depends on or represents the respective phase positions to be produced in the phase modulation, e.g. a data input D representing the data to be phase-modulated in the backscattering. In other words, for example, the control unit SE1 selectively connects either one or the other of the voltage sources U11 and U12 to the varactor C12 in response to and dependent on a bit sequence of data that is provided to the data input D and that is to be transmitted via the backscattering.

Figure 3:
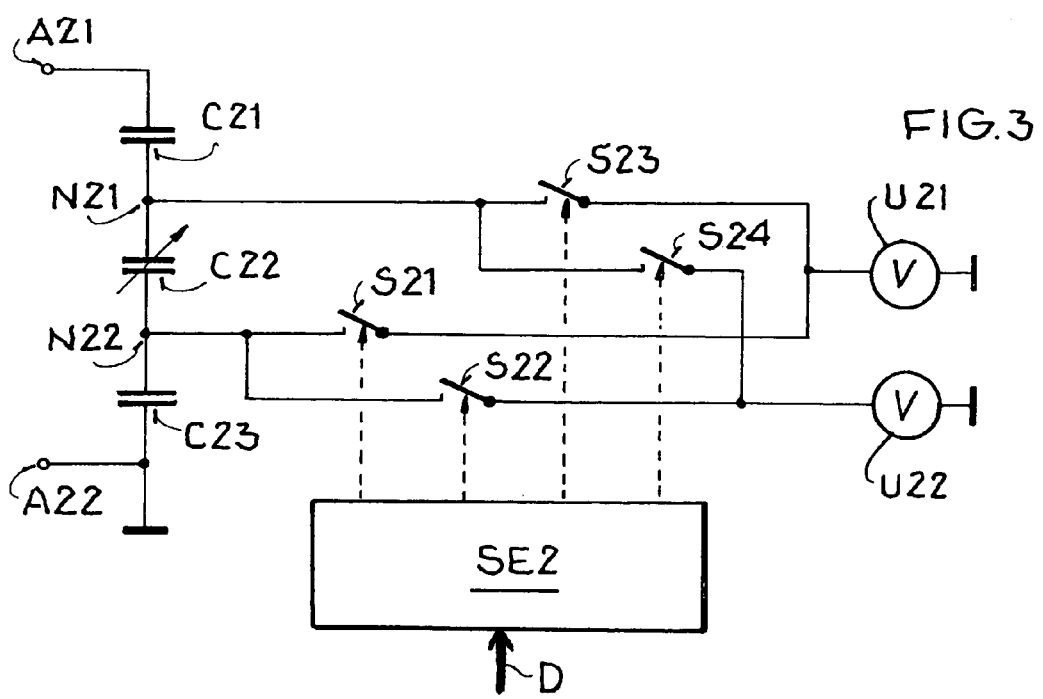
FIG. 3 is a schematic block circuit diagram of a second embodiment of an inventive circuit arrangement for phase modulation in a backscattering transponder.

FIG. 3 schematically shows a second embodiment of an inventive circuit arrangement for phase modulation in a backscattering transponder. This circuit arrangement comprises a first capacitor C21, a varactor C22, and a second capacitor C23 connected in series, with the varactor between the two capacitors, between two antenna terminals A21 and A22. The circuit arrangement further comprises a first voltage source U21 and a second voltage source U22, which are connected selectively via switching devices S21, S22, S23 and S24 to the connection terminals N21 and N22 of the varactor C22, and a control unit SE2 that is connected to the switching devices S21, S22, S23 and S24 for controlling these switching devices. If the varactor C22 is embodied as a suitably connected field effect transistor, the varactor terminal N21 may, for example be a gate terminal and the varactor terminal N22 may be a drain/source terminal of the field effect transistor. The voltage source U21 provides the ground voltage, while the voltage source U22 provides a supply voltage, which simultaneously may serve as a voltage supply of the transponder, i.e. of the control unit SE2 and all other powered components of the transponder (not shown). The control unit may have any conventionally understood construction for achieving the specified control operations or functions. The characteristic curve of the varactor C22 may be identical to the curve K shown in FIG. 2 for the varactor C12 of FIG. 1.

With the switching arrangement in the embodiment of FIG. 3, either one of the two voltage sources U21 and U22 can be selectively connected to either one of the varactor terminals N21 and N22 on opposite sides of the varactor C22. For generating a first phase position of the phase modulation, the switching devices S23 and S22 are closed and the switching devices S21 and S24 are opened, such that the voltage source U21 is connected to the varactor terminal or node N21 and the voltage source U22 is connected to the varactor terminal or node N22. The resulting voltage difference across the varactor C22 is given by the difference of the voltage values of the two voltage sources U21 and U22. Since U21 provides the ground voltage and U22 provides the supply voltage, it follows that the supply voltage is applied to the varactor C22 between the terminals N22 and N21. The associated capacitance of the varactor C22 is given by the characteristic curve K shown in FIG. 2, for the supply voltage.

Furthermore, it should be recognized that a short circuit of high frequency received signals through the switching devices to ground or to the supply voltage will not occur due to the high impedance, e.g. highly ohmic character, of the switching devices S21, S22, S23 and S24. Also, a d.c. decoupling or blocking of the voltage sources U21 and U22 relative to other circuit components is further provided by the capacitors C21 and C23.

For generating a second phase position or phase angle of the phase modulation, the control unit SE2 opens the switches S23 and S22 and closes the switches S21 and S24. Thereby, the voltage source U22 is connected with the varactor terminal or node N21, while the voltage source U21 is connected with the varactor terminal or node N22. It should be recognized that the voltage difference arising on the varactor C22 in this switching condition is inverted or reversed relative to the above described opposite switching condition. Namely, the ground and supply voltage have now been switched to opposite sides of the varactor C22. In connection with the symmetrical characteristic curve K of the capacitance-voltage characteristic of the varactor C22, this achieves an optimum utilization of the capacitance swing or range of the varactor C22 without requiring the generation of a negative voltage. This is achieved, because the capacitance of the CMOS varactor C22 is essentially only dependent on the voltage value and the polarity of the voltage applied between the varactor terminals or nodes N21 and N22.

In order to generate a third phase position or angle in the phase modulation using the circuit according to FIG. 3, both of the varactor terminals N21 and N22 are connected with one of the voltage sources U21 or U22. In other words, the switching control unit SE2 either closes the switching devices S23 and S21 and opens the switching devices S24 and S22, or alternatively opens the switching devices S23 and S21 and closes the switching devices S24 and S22. Since in either case the same voltage is applied to both sides of the varactor, the resulting voltage difference across the varactor C22 will be 0 V. Accordingly, this produces a capacitance of the varactor and a corresponding impedance of the input circuit between the values achieved in the above described two opposite switching positions, and thus achieves a third phase position between the above described first and second phase positions in the phase modulation.

As in the embodiment of FIG. 1, the switching control unit SE2 controls the switching devices S21, S22, S23 and S24 in response to and dependent on a control input, such as a data input D representing the bit sequence of data that is to be transmitted via the phase modulation of the backscattering.

The illustrated embodiments provide a simple circuit arrangement and method for activating and controlling the varactor C22 by means of circuit-connected voltage sources for generating a variable control voltage, without using a controllable variable voltage source. In other words, the present invention can make use of simpler, less costly individual voltage sources that each have a respective fixed or nominal voltage value, and avoids the need for a more complex and more costly controllable voltage source having a controllable variable voltage output. Nonetheless, the invention makes optimal utilization of the full available capacitance swing or range of the varactor, so that a reliable and secure data transmission can be achieved. Moreover, it is possible to provide two, three or even more phase positions of the phase modulation, simply by providing the corresponding number of voltage sources along with suitable switching devices.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A circuit arrangement adapted to vary an input impedance of an input circuit of a backscattering transponder to produce a phase modulation of a backscattered signal, said circuit arrangement comprising:
   a varactor that has first and second varactor terminals by which said varactor is connected in the input circuit;
   first and second voltage sources;
   a switching arrangement that is connected between said voltage sources and at least one of said varactor terminals, and that is adapted to selectively conductively connect and disconnect said voltage sources relative to said at least one of said varactor terminals; and
   a control unit that has at least one control output connected to at least one control input of said switching arrangement, and that is adapted to control said switching arrangement to selectively conductively connect said voltage sources to said at least one of said varactor terminals depending on a phase position that is to be provided in the phase modulation.

2. The circuit arrangement according to claim 1, wherein said varactor has a capacitance/voltage characteristic that is symmetrical relative to a zero voltage.

3. The circuit arrangement according to claim 1, wherein said switching arrangement comprises at least two high impedance CMOS switching devices.

4. The circuit arrangement according to claim 1, wherein said first voltage source is adapted to provide a ground voltage, and said second voltage source is adapted to provide a supply voltage.

5. The circuit arrangement according to claim 1, wherein said first and second voltage sources are respectively adapted to provide respective voltages of opposite polarity.

6. The circuit arrangement according to claim 1, wherein each one of said voltage sources is respectively a fixed invariable voltage source adapted to provide a respective fixed voltage.

7. The circuit arrangement according to claim 1, excluding any controllable variable voltage source.

8. The circuit arrangement according to claim 1, further comprising a third voltage source selectively connected via said switching arrangement to at least one of said varactor terminals.

9. The circuit arrangement according to claim 1, wherein at least one of said voltage sources is a supply voltage source adapted and connected to provide a supply voltage to the transponder.

10. The circuit arrangement according to claim 1, wherein said control unit further has a data input adapted to receive a data signal that is to be modulated in the phase modulation.

11. The circuit arrangement according to claim 1, further comprising a first capacitor connected in series with said varactor between first and second antenna terminals of the input circuit, and wherein said switching arrangement includes a first switching device that selectively conductively connects said first voltage source to said first varactor terminal and a second switching device that selectively conductively connects said second voltage source to said first varactor terminal.

12. The circuit arrangement according to claim 11, wherein said first capacitor is connected between said first antenna terminal and said first varactor terminal, said second varactor terminal is connected to said second antenna terminal, and the input circuit does not include any further capacitor connected in series with said first capacitor and said varactor between said first and second antenna terminals.

13. The circuit arrangement according to claim 1, further comprising a first capacitor and a second capacitor with said varactor therebetween, connected in series between first and second antenna terminals of the input circuit, and wherein said switching arrangement includes plural switching devices that respectively selectively conductively connect each one of said voltage sources respectively to each one of said varactor terminals.

14. The circuit arrangement according to claim 13, wherein said plural switching devices include a first switching device that selectively conductively connects said first voltage source to said first varactor terminal, a second switching device that selectively conductively connects said second voltage source to said first varactor terminal, a third switching device that selectively conductively connects said first voltage source to said second varactor terminal, and a fourth switching device that selectively conductively connects said second voltage source to said second varactor terminal.

15. A method of producing a phase modulation in a backscattering transponder having a varactor with first and second varactor terminals in an input circuit of said transponder, and having first and second voltage sources, said method comprising the steps:

a) providing control information dependent on a respective phase position of said phase modulation that is to be produced;

b) producing a first voltage with said first voltage source;

c) producing a second voltage with said second voltage source;

d) in response to said control information and dependent on said respective phase position, selectively applying at least one of said first voltage and said second voltage as a control voltage to at least one of said varactor terminals;

e) in response to and dependent on said control voltage, varying a capacitance of said varactor so as to correspondingly vary an input impedance of said input circuit, which produces said phase modulation.

16. The method according to claim 15, wherein said step d) comprises applying said first voltage to said first varactor terminal for a first said phase position and applying said second voltage to said first varactor terminal for a second said phase position different from said first phase position.

17. The method according to claim 15, wherein said step d) comprises applying said first voltage to said first varactor terminal and applying said second voltage to said second varactor terminal for a first said phase position, and applying said second voltage to said first varactor terminal and applying said first voltage to said second varactor terminal for a second said phase position different from said first phase position.

18. The method according to claim 17, wherein said step d) further comprises applying one of said voltages to both said first and second varactor terminals for a third said phase position different from said first and second phase positions.

* * * * *

UNITED STATES PATENT AND TRADEMARK OFFICE
CERTIFICATE OF CORRECTION

PATENT NO.        : 7,158,010 B2
APPLICATION NO.   : 10/855865
DATED             : January 2, 2007
INVENTOR(S)       : Fischer et al.

It is certified that error appears in the above-identified patent and that said Letters Patent is hereby corrected as shown below:

Column 1,
Lines 8 to 16, delete that paragraph and replace with:
--This application is related to: US Application 10/753,849 filed on January 7, 2004 and issued as US Patent 6,940,467 on September 6, 2005; US Application 10/753,859 filed on January 7, 2004; and US Application 10/855,866 filed on May 26, 2004; and the entire disclosures of all of the related applications are incorporated herein by reference.--.

Signed and Sealed this

Second Day of October, 2007

JON W. DUDAS
*Director of the United States Patent and Trademark Office*